(No Model.)

O. C. KNIPE.
BALL BEARING.

No. 546,818. Patented Sept. 24, 1895.

Witnesses
C. E. Ashley
H. W. Lloyd

Inventor
Oliver C. Knipe
By his Attorneys

UNITED STATES PATENT OFFICE.

OLIVER C. KNIPE, OF NORRISTOWN, PENNSYLVANIA.

BALL-BEARING.

SPECIFICATION forming part of Letters Patent No. 546,818, dated September 24, 1895.

Application filed February 19, 1895. Serial No. 538,965. (No model.)

*To all whom it may concern:*

Be it known that I, OLIVER C. KNIPE, a citizen of the United States, residing in Norristown, in the county of Montgomery and State of Pennsylvania, have invented certain new and useful Improvements in Ball-Bearings, of which the following is a specification.

This invention relates to ball-bearings.

The object of the invention is to provide a ball-race capable of being handled independently of the bearing without displacing the balls.

In carrying out my invention I provide a raceway formed of independent parts, to permit the balls to be readily assembled, and then lock the sections of the raceway together by a rigid casing. I preferably divide the raceway into two parts on a plane passing through the series of balls. Each of these parts has a circular interior curvature, so that when assembled they will form an annular internal raceway, the walls of which will embrace more than half of each ball and thereby confine it in place. After a series of balls have been assembled and the raceway completed I place over the latter in a suitable die a piece of hard-metal tubing, preferably steel, and by a co-operating member of the die flange the tube over the raceway, thereby firmly locking the parts together. An organization is thus provided which may be handled as an entirety and placed in or withdrawn from any suitable bearing with which it is to co-operate without possibility of disturbing the relationship of the balls or permitting the latter to escape.

The several features of novelty of the invention will be more particularly hereinafter described, and will be definitely indicated in the claims appended to this specification.

Figure 3:
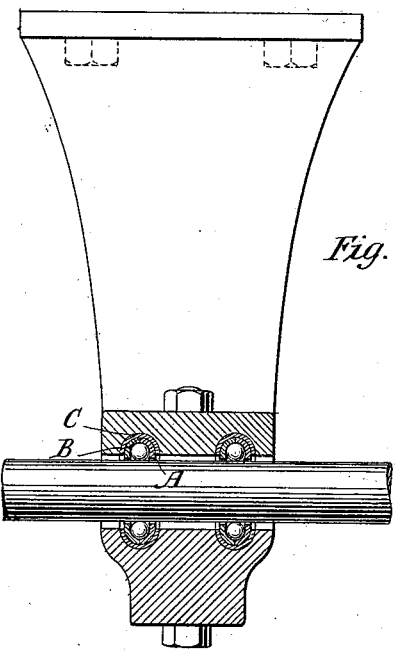
Figure 4:
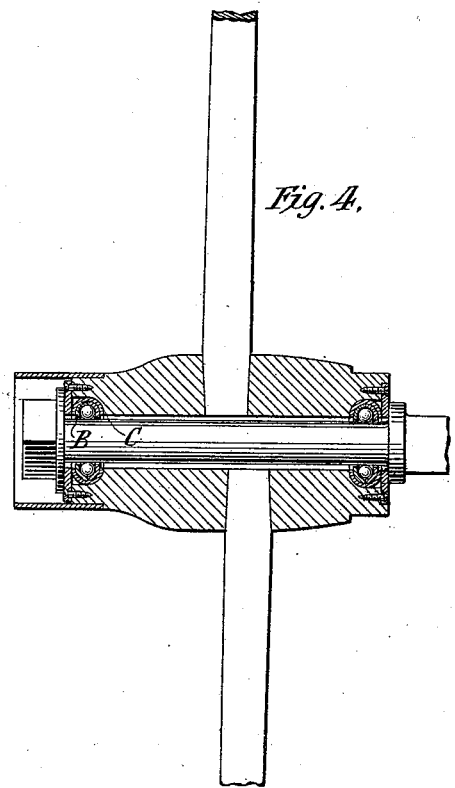
Figure 1:
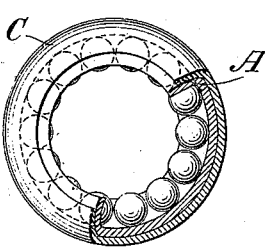
Figure 2:
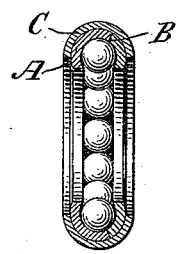

In the accompanying drawings, which illustrate the invention, Figure 1 is a side elevation, partly in section, of a ball-race embodying my improvement. Fig. 2 is a median section of Fig. 1 on a plane at right angles to that of the paper. Fig. 3 is a sectional view of a shaft hanger or bearing to which two of my improved ball-races have been applied. Fig. 4 is a sectional view of a hub of a wagon-wheel to which my improved races have been applied.

A represents a sectional annular shell, preferably made of cold-rolled steel, stamped into shape in suitable dies. The plane upon which the shell which forms the raceway is divided should be parallel to the plane of the shell, thus forming of its two sections two dish-shaped annular pieces, which when brought together will inclose more than half of the circumference of a ball, thus preventing the latter from dropping through the groove left at the edges of the shell. The shell may be divided on a plane passing through the center, as indicated at B in Figs. 3 and 4, but is preferably divided on a plane laterally displaced from the center, as shown at Fig. 2 at B. The latter construction leaves a perfectly smooth bearing-surface of continuous metal where the ball bears hardest against the raceway. With this organization the circular series of balls may be assembled in the larger section of the raceway or shell and the smaller section then laid in place. Around the shell forming the raceway is an exterior inclosing-casing C. This is preferably formed by placing a piece of cold-drawn-steel tubing over the shell A after the balls have been assembled and by means of a die forcing the ends of the tube to embrace the shell, as shown in the drawings. The sections of the shell are thus firmly locked together, and the balls can by no possibility fall out of the race. The latter may therefore be freely handled and removed from its bearing for cleaning or lubrication without danger of loss of the balls. The ball-race may be mounted in a bearing in any suitable way. The shells will be graded in size to suit the requirements of the shafts or axles with which they are to be associated, and the race may be dropped into a socket formed in a bearing and anchored in place in any suitable manner. For example, in Fig. 3 two of the races are shown as applied to a shaft-hanger, the ball-races being placed in grooves formed in the bracket and held in place by a face-plate bolted thereto. In Fig. 4, where two of my improved ball-races have been shown applied to a wagon-wheel, the hub may be bored at the ends to snugly admit the ball-race, and the latter be dropped or forced into place and end plates applied to hold them snugly in the socket in the hub. The two types of bearing shown in Figs. 3 and 4 are illustrated simply by way of example, as the race may be applied to any bearing where it is desirable to avoid friction losses. I have shown the balls mounted in the race so as to engage a journal within the race. It is evident that the groove in the race through which the balls project could be formed on the outer or side face of the casing and the inclosing or locking shell placed inside and flanged outwardly or otherwise to lock the sections of the ball-race together.

The ball-race when applied to a support or socket, as shown in Figs. 1 and 3, need not fit tightly therein, as the friction will always be greater between the casing and the socket than between the casing and the balls. It will be evident that as the balls are mounted so as to prevent their escape a full circle of balls need not necessarily be employed. As steel balls are made of definite standard sizes, this results in a great advantage in permitting the race to be fitted to any size of shaft or axle.

Where it is desired to adjust the bearing, the complete race and locking-casing may be confined in a cylindrical tube, in which it may be adjusted longitudinally of the bearing when desired, as described in my prior patent, No. 424,317, dated March 25, 1890.

Having thus described my invention, what I claim as new, and desire to secure by Letters Patent, is—

1. A ball bearing comprising a race way of independent annular parts meeting in a plane passing through the balls and forming an open annular way embracing more than half of each ball, and a casing around the raceway parts, as and for the purpose set forth.

2. A ball-race for a bearing comprising a sectional race-way A, B, containing a series of balls, and a casing C upset around the race-way to lock the sections permanently together.

In testimony whereof I have hereunto subscribed my name this 7th day of February, A. D. 1895.

OLIVER C. KNIPE.

Witnesses:
H. G. TYSON,
F. C. BOGGS.